E. TYDEN.
SEAL LOCKING DEVICE.
APPLICATION FILED FEB. 26, 1915.
1,155,770.
Patented Oct. 5, 1915.
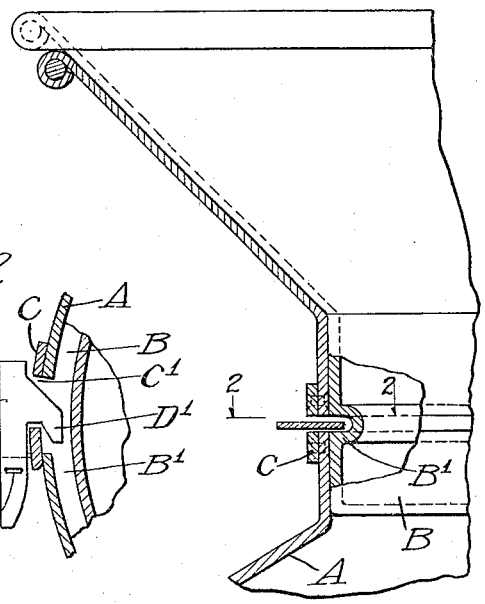
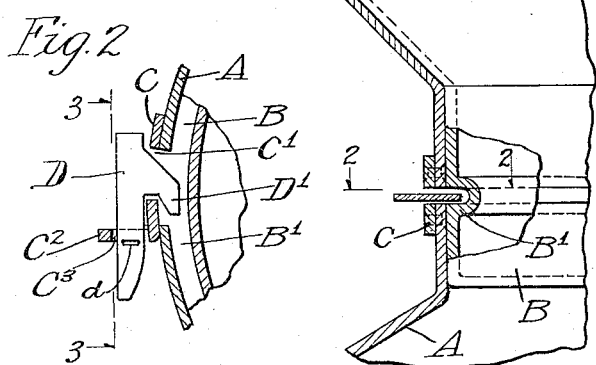
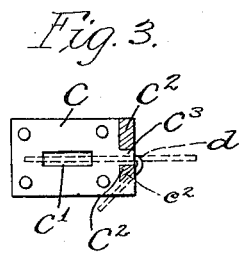
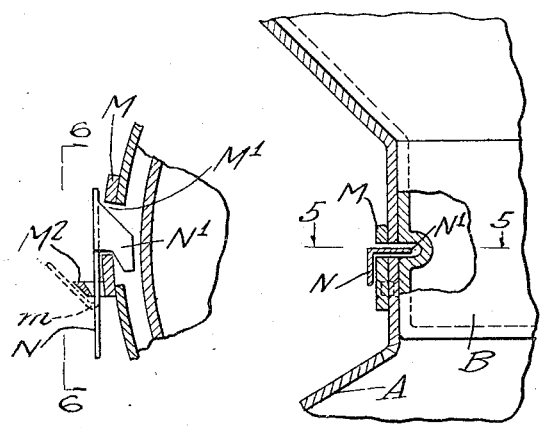
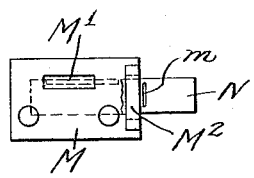
Witnesses:
Inventor:
Emil Tyden
by Burton & Burton
his Attys.

UNITED STATES PATENT OFFICE.

EMIL TYDEN, OF EVANSTON, ILLINOIS.

SEAL-LOCKING DEVICE.

1,155,770.   Specification of Letters Patent.   Patented Oct. 5, 1915.

Application filed February 26, 1915. Serial No. 10,815.

*To all whom it may concern:*

Be it known that I, EMIL TYDEN, a citizen of the United States, and resident of Evanston, in the county of Cook and State of Illinois, have invented new and useful Improvements in Seal-Locking Devices, of which the following is a specification, reference being had to the accompanying drawings, forming a part thereof.

The purpose of this invention is to provide an improved seal-locking device particularly adapted to be applied to cans and other articles in which two telescoping or overlapping parts are connected by the seal-locking device.

It consists in the elements and features of construction shown and described in the drawings as indicated by the claims.

In the drawings: Figure 1 is a radial section of a portion of a can having this invention applied to it. Fig. 2 is a section at the line 2—2 on Fig. 1. Fig. 3 is a section at the line 3—3 on Fig. 2. Fig. 4 is a view similar to Fig. 1, showing a modification. Fig. 5 is a section at the line 5—5 on Fig. 4. Fig. 6 is a front elevation of the mount with the seal in position partly broken away.

In the drawings, the device of this invention is represented as applied to a vessel of the nature of a can, having a body, A, and an interiorly telescoped cover, B, which constitutes the two members to be secured together by the seal-locking device. This device comprises a mount, C, which is a fitting folded up from flat metal and riveted upon the outer side of the body, A, having an aperture, $C^1$, through which the seal bolt, hereinafter described, enters (the can body being apertured coincidently with the aperture, $C^1$) to engage over a shoulder, $B^1$, formed on the interiorly telescoped cover and stopped by the engagement of the bolt to prevent the withdrawal of the cover. In the form shown in the first three figures, the mount, C, has a lug, $C^2$, folded at right angles to the web, and having an aperture, $C^3$, making of the lug a staplelike device.

D is the seal bolt having one end adapted to be thrust through the aperture, $C^3$, of the staple, and having near the other end a hook projecting off from one edge adapted to be entered through the aperture, $C^1$, in the mount, the engagement of the seal body through the aperture, $C^3$, being loose enough to permit the edgewise movement of the seal bolt after it is thrust through the staple as described, for entering the laterally projecting hook, as described, through the aperture, $C^1$. The hook projection, $D^1$, is given its hook form by being undercut at the edge facing toward the end of the seal bolt which has been thrust as described through the staple, and after the hook has been entered through the aperture, $C^1$, the seal is drawn endwise to engage the hook with the margin of the aperture, $C^1$, as seen in Fig. 2. The seal bolt is weakened as by an aperture, $d$, at a line which stands just beyond the staple when the seal bolt has been drawn endwise as described for engaging the hook with the margin of the aperture, $C^1$, and the seal being now bolted laterally at this weakened line against the outer side of the staple, becomes engaged therewith so that it cannot be thrust endwise in the direction for disengaging the hook without first straightening back the seal bolt to its original form, and by reason of the character of the metal and the weakening at the aperture, $d$, such straightening will break the seal at the weakened line and disclose the attempt to tamper with the sealing. As illustrated in the drawings (see Fig. 3), the staple, $C^2$, preferably has one edge beveled off as seen at $c^2$, making an acute angle with the lower edge of the aperture, $C^3$, so that the seal bolt when folded at the aperture, $d$, as described, may be folded back at an acute angle to the length of the seal bolt, thus more certainly to insure the breaking of the seal when it is straightened out.

In Figs. 4, 5 and 6, there is shown a modification in which the seal bolt is adapted to be lodged flatwise instead of edgewise against the body of the can, thus reducing the necessary height of the staple and the total protrusion of the whole device. In this form, the mount, M, having the aperture, $M^1$, has the staple, $M^2$, struck out from the web forming a narrow band upraised in position to admit the thickness of the seal bolt, N, under it. Said seal bolt, N, in this form has the hook, $N^1$, folded at right angles to the plane of the body of the seal bolt. The staple, $M^2$, is at sufficient distance from the aperture, $M^1$, to permit the end of the seal body being inserted under the staple and the seal body thrust endwise to bring the hook, $N^1$, to the aperture, $M^1$, without springing or bending the seal body beyond what it will readily bear, and this without making the fit of the seal under the staple unduly loose. The seal body is weakened at a transverse line which will stand just beyond the staple when the seal has been thrust under the staple and the hook entered through the aperture, M¹, and then further moved longitudinally so as to engage the edge of the aperture as seen in Fig. 5, the weakening being effected in the same manner as in the other form by an aperture, m, extending transversely at the position indicated. When inserted as described the seal bolt is folded back over the staple and may even be folded back flat onto the remainder of the length of the seal, as seen in Fig. 5, thus preventing the withdrawal of the hook without first straightening out the seal which would result in breaking the latter.

I claim:—

1. A flat seal bolt having a hook extending off laterally therefrom, in combination with a mount having an aperture for engagement with the hook, and having a guard which extends for stopping the seal bolt laterally in the direction for withdrawing the hook from the aperture, through which guard the seal bolt is thrust to bring the hook opposite the aperture for inthrust of the hook therethrough, the seal being weakened for folding at a transverse line positioned beyond the guard at the engaged position of the hook for causing the folded part to extend adjacent to the guard and adapted to break upon being straightened back so as to be withdrawn through the guard.

2. A flat seal bolt having a hook extending off from one lateral edge thereof, in combination with a mount for the same, having an aperture for engagement of the hook, and having a guard which extends for stopping the seal bolt laterally in the direction for withdrawing the hook from the aperture, through which guard the seal bolt is thrust to bring the hook opposite the aperture for engagement therewith, the seal being weakened for folding at a transverse line positioned just beyond the guard when the hook is engaged, and adapted to break upon being straightened back for withdrawal from the guard.

3. A flat seal bolt having a hook extending off from one lateral edge and transverse to the plane of the seal bolt, in combination with a mount for the latter, having an aperture for engagement of the hook and having a guard device under which the seal bolt may be thrust to bring the hook opposite the aperture for engagement therewith, the seal bolt being weakened for folding at a transverse line positioned just beyond the guard device when the hook is engaged, and adapted to break upon being straightened back for withdrawal from the guard.

4. A flat seal bolt having a hook extending off laterally therefrom, in combination with a mount having an aperture for engagement with the hook, and a guard which extends for stopping the seal bolt laterally in the direction for withdrawing the hook from the aperture, under which guard the seal bolt is thrust longitudinally in one direction to bring the hook opposite the aperture for entrance thereinto, the hook having its engaging terminal projecting for such engagement in the direction of said longitudinal thrust, whereby further thrust in that direction after the hook enters the aperture is necessary for engaging the hook, the seal bolt being weakened for folding at a transverse line immediately beyond the guard at the position occupied after the complete inthrust for engaging the hook, and adapted to break upon being straightened back to its normal position.

5. In a flat seal bolt having a hook extending off from one lateral edge, in combination with a mount having an aperture for entrance of the hook by lateral edgewise movement of the seal bolt, and a guard under which the seal bolt is thrust longitudinally to bring the hook opposite the entrance to said aperture, the hook having its engaging terminal projecting for engagement in the direction of said longitudinal thrust, whereby further thrust in the same direction after the hook enters the aperture is necessary for engaging the hook, the seal being weakened for folding at a transverse line which stands immediately beyond said guard after the hook has been engaged, and adapted to break upon being straightened back to its normal position.

In testimony whereof I have hereunto set my hand at Chicago, Illinois, this 8th day of February, 1915.

EMIL TYDEN.

Witnesses:
 EDNA M. MACINTOSH,
 LUCY I. STONE.

Copies of this patent may be obtained for five cents each, by addressing the "Commissioner of Patents, Washington, D. C."